March 9, 1954   M. L. JURASEVICH   2,671,536
SHOCK ABSORBER
Filed May 28, 1951   2 Sheets-Sheet 1
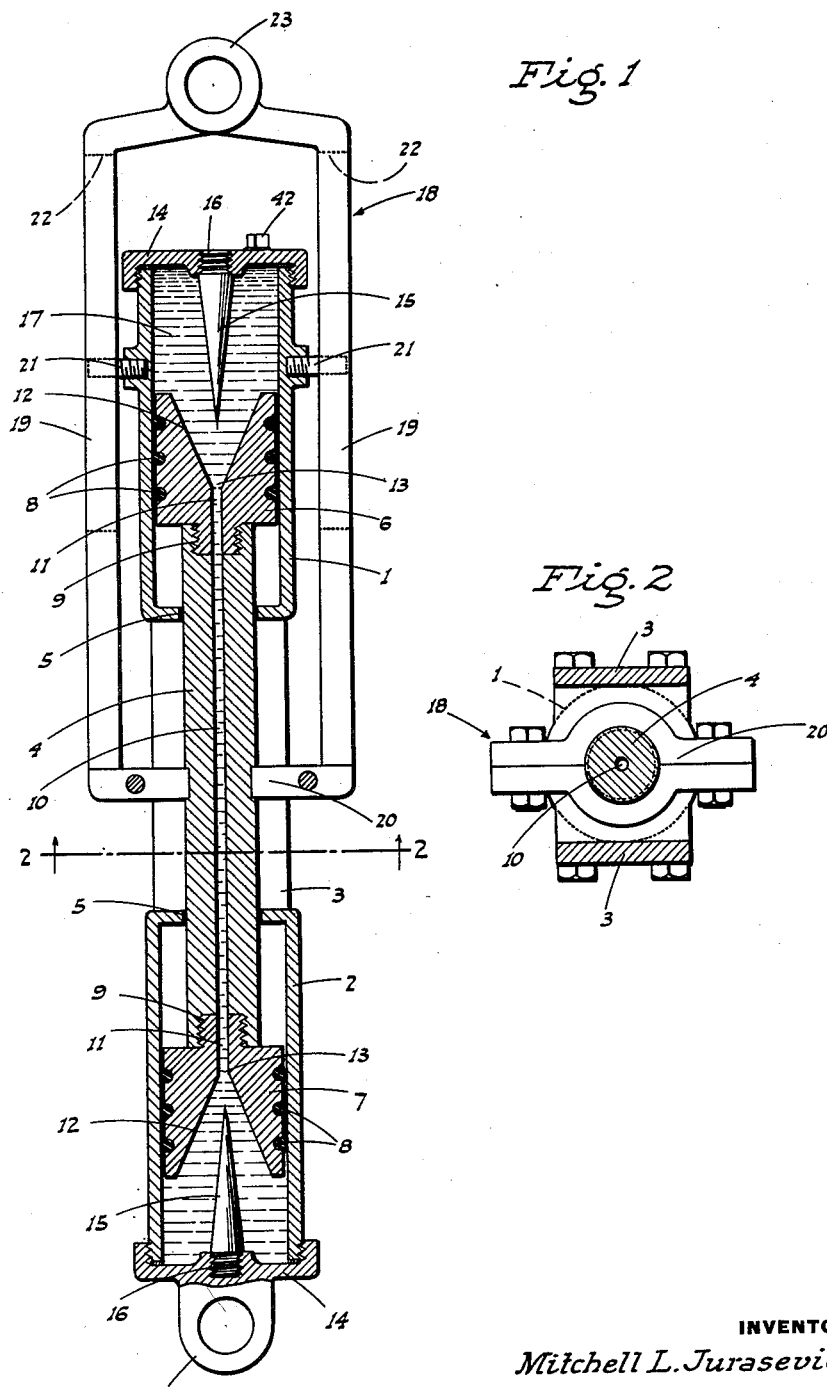
INVENTOR
Mitchell L. Jurasevich
BY
ATTORNEYS March 9, 1954  M. L. JURASEVICH  2,671,536
SHOCK ABSORBER
Filed May 28, 1951  2 Sheets-Sheet 2
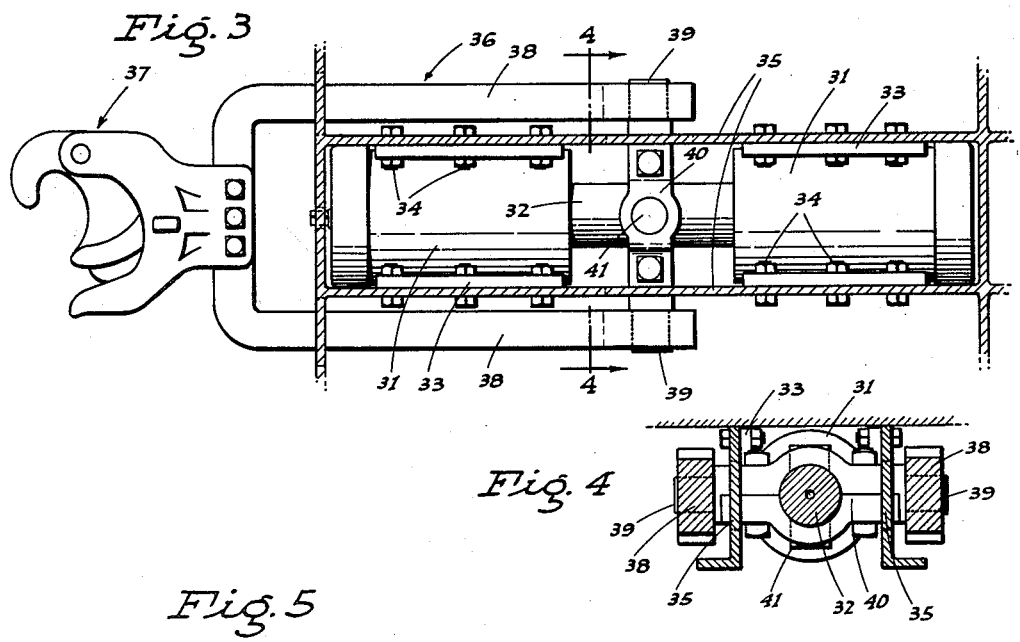
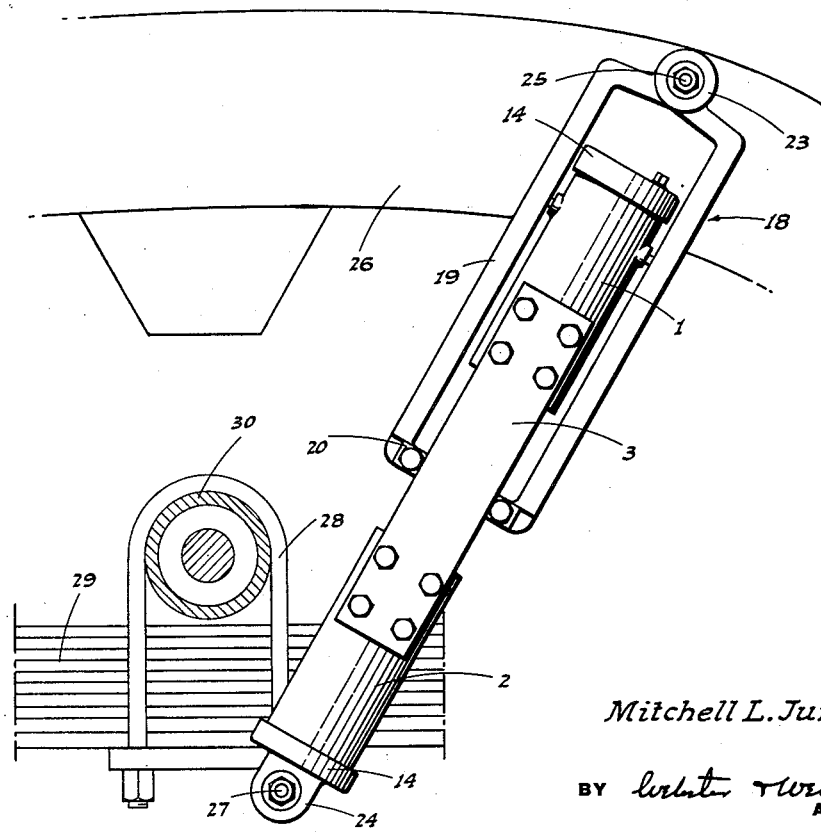
INVENTOR
*Mitchell L. Jurasevich*
BY *Webster + Webster*
ATTORNEYS Patented Mar. 9, 1954

2,671,536

UNITED STATES PATENT OFFICE 2,671,536

SHOCK ABSORBER

Mitchell L. Jurasevich, Alturas, Calif., assignor to Elsie Myrtle Jurasevich, Alturas, Calif.

Application May 28, 1951, Serial No. 228,659

1 Claim. (Cl. 188—98)

This invention is directed to, and it is a major object to provide, an improved shock absorber; the device while of general utility being especially for use on motor vehicles, and in connection with railroad car couplings or the like.

Another important object of this invention is to provide an improved shock absorber of double-acting, hydraulic type.

Still another object of the invention is to provide a double-acting, hydraulic shock absorber which embodies a novel assembly of pistons working in opposed cylinders containing hydraulic brake fluid, with a tubular connecting rod extending between the pistons and establishing communication between said cylinders, and a unique needle valve arrangement in each cylinder operative to progressively restrict fluid flow through said tubular connecting rod when the corresponding piston moves in a fluid displacing direction, whereby such restriction causes a proportioned shock absorbing action.

An additional object of the invention is to provide a shock absorber which can be readily adapted for use on different kinds of equipment, with the shock absorber assembly remaining unchanged in structure for each adaptation.

A further object of the invention is to provide a shock absorber which is positive but smooth in action.

It is also an object of the invention to provide a shock absorber designed for ease and economy of manufacture; the shock absorber being easy to install and requiring a minimum of maintenance and repair.

Still another object of the invention is to provide a practical and reliable shock absorber, and one which will be exceedingly effective for the purpose for which it is designed.

These objects are accomplished by means of such structure and relative arrangement of parts as will fully appear by a perusal of the following specification and claim.

In the drawings:

Fig. 1 is a sectional elevation of the novel shock absorber as arranged—for example—for use on a motor vehicle.

Fig. 2 is a cross section of the shock absorber taken in the plane of line 2—2 of Fig. 1.

Fig. 3 is a plan view of the shock absorber as modified and mounted for use in connection with a railroad car coupling.

Fig. 4 is a cross section on line 4—4 of Fig. 3.

Fig. 5 is a side elevation of the shock absorber, as in Fig. 1, as mounted on a motor vehicle such as a passenger car or truck.

Referring now more particularly to the characters of reference on the drawings, and at present to Figs. 1 and 2, the shock absorber comprises a pair of opposed axially alined cylinders, indicated at 1 and 2; such cylinders being spaced apart at adjacent ends and connected, on opposite sides, by tie plates 3. The tie plates 3 maintain the cylinders 2 in fixed, axial alinement, and a connecting rod 4 extends between, and slidably projects at the end portions into said cylinders 1 and 2 through end ports 5 therein.

Within the cylinders 1 and 2 there are corresponding pistons 6 and 7, which pistons carry suitable piston rings 8; such pistons 6 and 7 being fixed to the corresponding ends of the connecting rod 4, as at 9.

The connecting rod 4 is tubular, the axial passage being indicated at 10. The pistons 6 and 7 have similar passages 11 in communication with the axial passage 10. The axial passage 10 and the portions of the passages 11 in the inner ends of the pistons 6 and 7 are of restricted diameter; the remaining portions of the passages 11 flaring, as shown, in said pistons to form taper or flaring bores 12. Each piston thus has a taper bore 12 whose inner end is in communication with the corresponding restricted diameter passage 11; the point of communication being indicated at 13, and hereinafter described as the "throat."

Each of the pistons 6 and 7 is fitted at the outer end with a cap 14, and an elongated needle valve 15 is threaded axially into each cap 14 on the inside, as at 16, with the needle valve projecting axially into the corresponding flaring bore 12.

When the pistons 6 and 7 are in a normal position intermediate the ends of the cylinders 1 and 2, the needle valves 15 project into the flaring bores 12 but are spaced from the throats 13. The cylinders 1 and 2 are filled with a hydraulic brake fluid 17, with such fluid also filling the bores 12 and the axial passages 10 and 11.

The above described shock absorber assembly is provided with the following mounting means:

An elongated or longitudinal yoke, indicated generally at 18, straddles the cylinder 1 from its outer end, being of substantially greater length than said cylinder. The legs 19 of the yoke 18 are fixed, at their inner ends, to a cross clamp 20 secured to the connecting rod 4 intermediate the inner ends of the cylinders 1 and 2.

Opposed radial guide pins 21 project from the cylinder 1 and ride in longitudinal guide slots 22 in the yoke legs 19.

An attachment eye 23 is formed centrally on the outer end of the yoke 18, while another attachment eye 24 is formed centrally on the cap 14 at the opposite end of the device.

For use on a motor vehicle, such as a passenger car or truck, the above described shock absorber is mounted in the manner shown in Fig. 5; the eye 23 being secured by a bolt 25 to the frame 26 of the vehicle; the device thence extending downwardly and eye 24 being attached, as at 27, to the spring shackle 28 which connects the spring 29 to the axle housing 30.

With relative vertical play between the spring 29 and frame 26, the shock absorber works, in a double-acting manner, as follows:

Upon relative upward movement of the spring 29, the cylinder 2 is raised, causing downward travel of the piston 7 in said cylinder; the tendency thus being for such piston to displace the shock absorber fluid 17 from cylinder 2 upwardly in the tubular connecting rod 4. However, shortly after such motion of the piston begins, the needle valve 15 progressively imposes restriction in the flaring bore 12, and particularly in the related throat 13. This restriction results in back pressure against the piston 7, producing a proportioned shock absorbing action, which action is positive but smooth. The fluid which does pass through the connecting rod 4 is of course received in the opposite cylinder.

Upon relative downward motion of the spring 29 a similar shock absorbing action is attained, except that such action is here produced by the uppermost cylinder 1, piston 6, and the related needle valve 15.

It will thus be recognized that the shock absorber is double-acting, working with equal effectiveness in either direction of play.

The guide pins 21 assure of the maintenance of the longitudinal yoke 18 in proper alinement with the remainder of the device, particularly with respect to the direction of travel of the parts.

In Figs. 3 and 4, wherein the device is adapted for use with a railroad car coupling, the shock absorber assembly remains the same, including opposed cylinders 31 having a connecting rod 32 extending therebetween in connection with the pistons (not shown) in said cylinders. Here, however, the tie plates between the cylinders are omitted, and such cylinders are fixed by attachment flanges 33 and bolts 34 directly in connection with frame members or plates 35 of the railroad car frame; the device being mounted lengthwise of the car centrally of its sides and at one end thereof.

An elongated yoke, indicated generally at 36, straddles the device from its outer end; the corresponding end of said yoke being fitted with a rear coupling 37.

At their inner ends the yoke legs 38 are attached to laterally projecting trunnions 39 on a cross clamp 40 fixed to the connecting rod 32 intermediate the adjacent ends of the cylinders 31. A securing pin 41 extends through the cross clamp 40 and connecting rod 32 to assure against any relative sliding movement between such parts.

When the shock absorber is used in connection with a railroad car coupling, as above, the coupling 37 is engaged with a mating coupling part on the end of the next railroad car; the shock absorber being effective to prevent undue jarring between the railroad cars of a train upon the latter starting or stopping. As the device is double-acting, it is effective as a shock absorber in either direction of impact.

For servicing of the shock absorber, i. e. to supply additional fluid 17 when required, one of the caps 14 is provided with a filler plug 42, as clearly shown in Fig. 1.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

A double-acting, hydraulic shock absorber comprising a pair of cylinders spaced in end to end alinement, means securing the cylinders fixed as a unit, a piston in each cylinder, the latter having brake fluid therein, a rod connecting the pistons as a unit, valve and passage means in the cylinders and unit to progressively restrict fluid flow from one cylinder to the other upon relative movement of the rod, said rod between the cylinders having an annular groove, a two-part cross clamp about the rod and engaging the groove, a yoke straddling one cylinder and including legs secured to one part of the clamp, and opposed pins projecting from said one cylinder and working in longitudinal slots in the yoke legs; there being attachment elements on the outer end of the yoke and the other cylinder.

MITCHELL L. JURASEVICH.

References Cited in the file of this patent

UNITED STATES PATENTS

| Number | Name | Date |
|---|---|---|
| 446,183 | Hill | Feb. 10, 1891 |
| 717,667 | Felt et al. | Jan. 6, 1903 |
| 1,156,646 | Walker | Oct. 12, 1915 |
| 1,621,261 | Lomar | Mar. 15, 1927 |
| 1,655,786 | Guerritore | Jan. 10, 1928 |
| 1,811,152 | Seversky | June 23, 1931 |
| 2,039,135 | Waugh et al. | Apr. 28, 1936 |
| 2,053,053 | Swalm | Sept. 1, 1936 |
| 2,172,346 | Burns | Sept. 12, 1939 |
| 2,559,633 | Katz | July 10, 1951 |

FOREIGN PATENTS

| Number | Country | Date |
|---|---|---|
| 301,761 | Great Britain | Jan. 18, 1928 |
| 366,156 | Italy | Sept. 26, 1938 |